United States Patent
Muthukrishnan et al.

(10) Patent No.: US 10,200,387 B2
(45) Date of Patent: Feb. 5, 2019

(54) USER STATE TRACKING AND ANOMALY DETECTION IN SOFTWARE-AS-A-SERVICE ENVIRONMENTS

(71) Applicant: International Business Machines Corporation, Armonk, NY (US)

(72) Inventors: Ravi Krishnan Muthukrishnan, Bangalore (IN); Jeffrey Robert Hoy, Cary, NC (US); Sreekanth Ramakrishna Iyer, Bangalore (IN); Kaushal Kiran Kapadia, Pune (IN); Nataraj Nagaratnam, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 14/954,676

(22) Filed: Nov. 30, 2015

(65) Prior Publication Data
US 2017/0155672 A1    Jun. 1, 2017

(51) Int. Cl.
*H04L 29/06* (2006.01)
*H04L 29/08* (2006.01)

(52) U.S. Cl.
CPC .......... *H04L 63/1425* (2013.01); *H04L 67/02* (2013.01)

(58) Field of Classification Search
CPC ........................... H04L 63/1425; H04L 67/02
See application file for complete search history.

(56) References Cited

U.S. PATENT DOCUMENTS

| | | |
|---|---|---|
| 7,290,266 B2 | 10/2007 | Gladstone et al. |
| 7,594,267 B2 | 9/2009 | Gladstone et al. |
| 8,468,244 B2 | 6/2013 | Redlich et al. |
| 8,595,170 B2 | 11/2013 | Gladstone et al. |
| 8,762,215 B2 | 6/2014 | Barras et al. |
| 9,397,884 B2 * | 7/2016 | Chatterjee ........... H04L 41/5041 |
| 9,626,240 B2 * | 4/2017 | Rajkovic ............. G06F 11/0781 |

(Continued)

OTHER PUBLICATIONS

Meng et al, "Resource-Aware Application State Monitoring," IEEE Transactions on Parallel and Distributed Systems, 2013.

(Continued)

*Primary Examiner* — Joseph P Hirl
*Assistant Examiner* — Stephen T Gundry
(74) *Attorney, Agent, or Firm* — Jeffrey S. LaBaw; David H. Judson (57) ABSTRACT

A user state tracking and anomaly detector for multi-tenant SaaS applications operates in association with a log management solution, such as a SIEM. A given SaaS application has many user STATES, and the applications often have dependencies on one another that arise, for example, when a particular application makes a request (typically on behalf of a user) to take some action with respect to another application. The detector includes a mapper that maps the large number of user STATES to a reduced number of mapped states (e.g., "red" and "green"), and a dependency module that generates user-resource dependency graphs. Using a dependency graph, a SaaS modeler in the detector checks whether a particular dependency-based request associated with a SaaS application is valid. State and dependency information generated by the mapper and dependency module are reported back to the log management solution to facilitate improved logging and anomaly detection.

18 Claims, 6 Drawing Sheets

(56) References Cited

U.S. PATENT DOCUMENTS

| | | | | |
|---|---|---|---|---|
| 9,665,390 | B2* | 5/2017 | Chen | G06F 9/45558 |
| 9,667,470 | B2* | 5/2017 | Prathipati | H04L 29/14 |
| 9,680,715 | B2* | 6/2017 | Abuelsaad | H04L 41/0883 |
| 9,690,669 | B2* | 6/2017 | Bernal | G06F 11/1461 |
| 9,692,858 | B2* | 6/2017 | Jain | G06F 21/6218 |
| 9,705,763 | B2* | 7/2017 | Harishankar | H04L 43/062 |
| 9,710,626 | B2* | 7/2017 | Jain | G06F 21/31 |
| 9,720,784 | B2* | 8/2017 | Bernal | G06F 11/1461 |
| 9,727,407 | B2* | 8/2017 | Ruan | G06F 11/2257 |
| 9,729,569 | B2* | 8/2017 | Teilhet | H04L 63/1433 |
| 9,729,623 | B2* | 8/2017 | Huang | H04L 67/1014 |
| 9,734,005 | B2* | 8/2017 | Ruan | G06F 11/2257 |
| 9,760,736 | B2* | 9/2017 | Clarke | G06F 21/6281 |
| 2008/0022359 | A1* | 1/2008 | Gladstone | G06F 9/468 726/1 |
| 2011/0110647 | A1 | 5/2011 | Prorock et al. | |
| 2011/0258621 | A1* | 10/2011 | Kern | G06F 9/5072 718/1 |
| 2011/0258692 | A1* | 10/2011 | Morrison | G06F 21/53 726/11 |
| 2012/0072985 | A1* | 3/2012 | Davne | H04L 63/0272 726/22 |
| 2012/0179646 | A1* | 7/2012 | Hinton | G06F 17/30557 707/607 |
| 2012/0179817 | A1* | 7/2012 | Bade | G06F 8/61 709/225 |
| 2012/0179822 | A1* | 7/2012 | Grigsby | G06F 9/5072 709/226 |
| 2012/0180039 | A1* | 7/2012 | Bravery | G06F 8/60 717/178 |
| 2012/0180040 | A1* | 7/2012 | DeLuca | G06F 17/30867 718/1 |
| 2012/0180041 | A1* | 7/2012 | Fletcher | G06F 9/45558 718/1 |
| 2012/0254957 | A1* | 10/2012 | Fork | G06F 21/33 726/6 |
| 2013/0007268 | A1* | 1/2013 | Breiter | G06F 11/3006 709/224 |
| 2013/0007845 | A1* | 1/2013 | Chang | G06F 21/62 726/4 |
| 2013/0019015 | A1* | 1/2013 | Devarakonda | G06F 9/5072 709/226 |
| 2013/0066945 | A1* | 3/2013 | Das | G06F 15/16 709/203 |
| 2013/0067469 | A1* | 3/2013 | Das | G06F 9/5077 718/1 |
| 2013/0073670 | A1* | 3/2013 | Das | G06F 9/5027 709/217 |
| 2013/0073703 | A1* | 3/2013 | Das | G06F 9/5072 709/223 |
| 2013/0074064 | A1* | 3/2013 | Das | G06F 8/61 718/1 |
| 2013/0074179 | A1* | 3/2013 | Das | G06F 9/452 726/18 |
| 2013/0198740 | A1* | 8/2013 | Arroyo | H04L 41/0806 718/1 |
| 2013/0263242 | A1* | 10/2013 | Jain | G06F 21/78 726/9 |
| 2014/0013423 | A1* | 1/2014 | Jain | G06F 21/31 726/19 |
| 2014/0020077 | A1* | 1/2014 | Court | H04L 63/1466 726/8 |
| 2014/0026191 | A1* | 1/2014 | Jain | G06F 21/6218 726/4 |
| 2014/0068732 | A1* | 3/2014 | Hinton | G06F 21/41 726/6 |
| 2014/0101177 | A1 | 4/2014 | Saito | |
| 2015/0195303 | A1* | 7/2015 | Holden | H04L 63/1458 709/229 |
| 2016/0092295 | A1* | 3/2016 | Rajkovic | G06F 11/0781 714/49 |
| 2016/0350173 | A1* | 12/2016 | Ahad | G06F 11/3495 |
| 2017/0063912 | A1* | 3/2017 | Muddu | H04L 63/1425 |
| 2017/0116013 | A1* | 4/2017 | Chen | G06F 9/45558 |
| 2017/0116436 | A1* | 4/2017 | Wu | G06F 21/6227 |
| 2017/0118268 | A1* | 4/2017 | Wu | H04L 67/02 |
| 2017/0118283 | A1* | 4/2017 | Liu | H04L 67/1097 |
| 2017/0124084 | A1* | 5/2017 | Borghetti | G06F 11/302 |
| 2017/0147297 | A1* | 5/2017 | Krishnamurthy | G06F 8/34 |
| 2017/0161102 | A1* | 6/2017 | Rangaraju | G06F 9/4843 |
| 2017/0222888 | A1* | 8/2017 | Abuelsaad | H04L 41/0883 |
| 2017/0244613 | A1* | 8/2017 | Vasudevan | H04L 41/50 |
| 2017/0286652 | A1* | 10/2017 | Jain | G06F 21/31 |

OTHER PUBLICATIONS

Dasgupta et al, "Paths in graphs," Chapter 4, publication date unknown but published prior to Nov. 2015.

* cited by examiner

USER STATE TRACKING AND ANOMALY DETECTION IN SOFTWARE-AS-A-SERVICE ENVIRONMENTS

BACKGROUND OF THE INVENTION

Technical Field

This disclosure relates generally to deploying applications in a "cloud" compute environment.

Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Software as a Service (SaaS) refers to the capability provided to the consumer is to use a provider's applications running on a cloud infrastructure. SaaS applications are accessible from various client devices through a thin client interface such as a web browser (e.g., web-based e-mail). In this model, the consumer does not manage or control the underlying cloud infrastructure including network, servers, operating systems, storage, or even individual application capabilities, with the possible exception of limited user-specific application configuration settings.

With ever-increasing numbers of users of SaaS technologies, monitoring SaaS applications is becoming more important. Monitoring security of a SaaS application differs significantly from traditional application monitoring because of its multi-tenancy nature, the fact that the application can be accessed from a variety of devices, the fact that the application can be accessed from anywhere, and further because security intelligence tools use HTTP/HTTPS mechanisms to detect anomalies (from the SaaS application/user activity logs). These differences make consumption and monitoring of logs from SaaS environments very difficult for traditional device-based log management solutions, such as SIEM-based systems. Primarily, this is because the event processing model of these log management solutions are tuned towards device monitoring.

Because application states do not fall into the normal event-based models, there are significant performance bottlenecks in monitoring SaaS logs by known log management solutions. These known approaches are also deficient in that they are rule-based and thus lack to capability to monitor dependencies across SaaS applications. Further, SIEM solutions typically rely upon HTTP to fetch logs, but HTTP is stateless and thus less useful for anomaly detection where states change dynamically and need to be monitored separately. Prior techniques are also problematic because they require querying of the state of application resources and business objects using a large number of API calls, which are computationally intensive and costly.

There remains a need to address the problems and deficiencies of current approaches to SaaS security monitoring.

BRIEF SUMMARY

According to this disclosure, a user state tracking and anomaly detector for SaaS applications is provided, preferably in association with a log management solution such as a SIEM. The SaaS applications execute in a multi-tenant cloud environment. A given SaaS application in the environment typically supports multiple tenants, and the application typically has many user STATES (e.g., user terminated, user frozen, user active, etc.) Individual SaaS applications in the cloud environment typically have dependencies on one another that arise, for example, when a particular SaaS application makes a request (typically on behalf of a user) to take some action with respect to some other SaaS application in the environment.

The user state tracking and anomaly detector includes a collector module that collects (or otherwise receives) user STATE information from each of a set of configured SaaS applications. A mapper module in the detector then performs an entity-relationship mapping of this data, preferably to map "n" number of user STATES to a reduced number of states (e.g., two (2)) states, e.g. a "green" state corresponding to an acceptable functioning state, and a "red" state corresponding to a non-acceptable or malfunctioning state). More than two (2) states may be used. The resulting mapped STATE data is the provided to the log management solution.

In addition, the collector module in the user state tracking and anomaly detector collects (or otherwise receives) the dependency data that indicates SaaS application dependencies or from which such dependencies can be ascertained. A dependency module in the detector uses this information to generate a dependency graph, e.g., a real-time directed graph G=(V, E), where a V is a node in the graph that represents a SaaS user/resource, and E is an edge in the graph that represents a dependency link between the resources. An edge E is created whenever a dependency is created, and an edge E is deleted when this dependency changes or is deleted. Using the dependency graph, a SaaS modeler in the detector can check whether a particular dependency-based request associated with a SaaS application is valid or invalid and report the results back to the associated log management solution.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
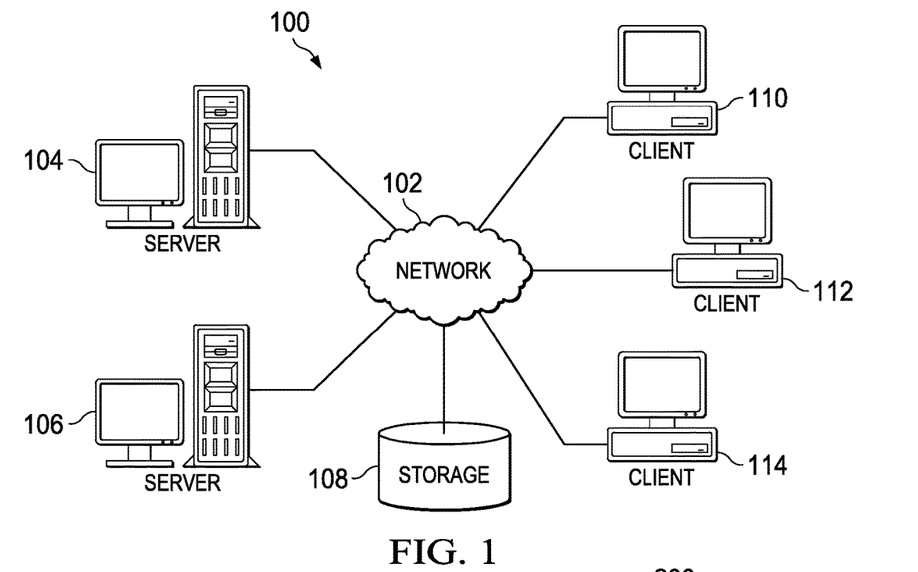
FIG. 1 depicts an exemplary block diagram of a distributed data processing environment in which exemplary aspects of the illustrative embodiments may be implemented.
Figure 2:
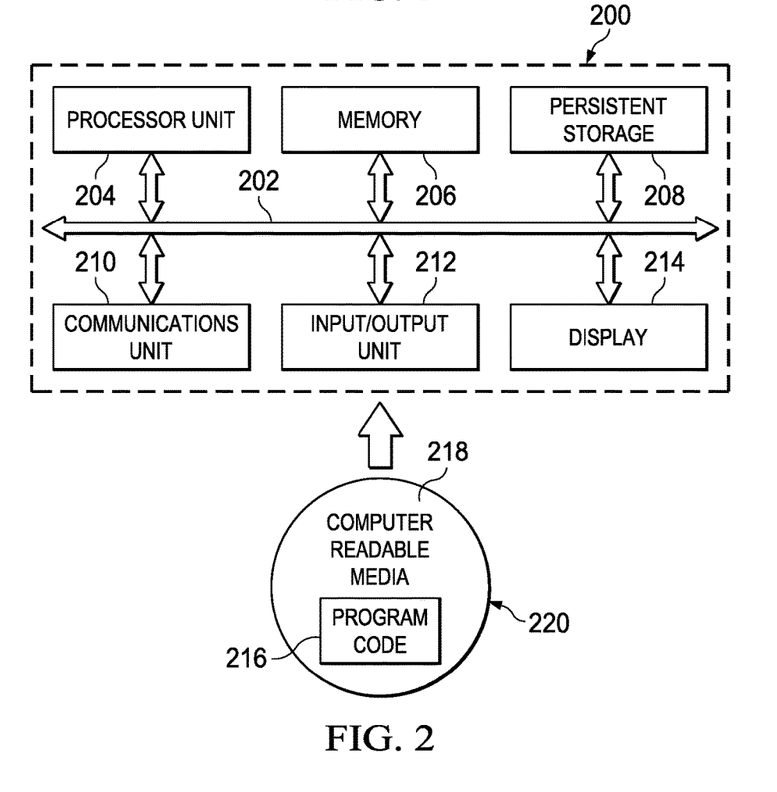
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
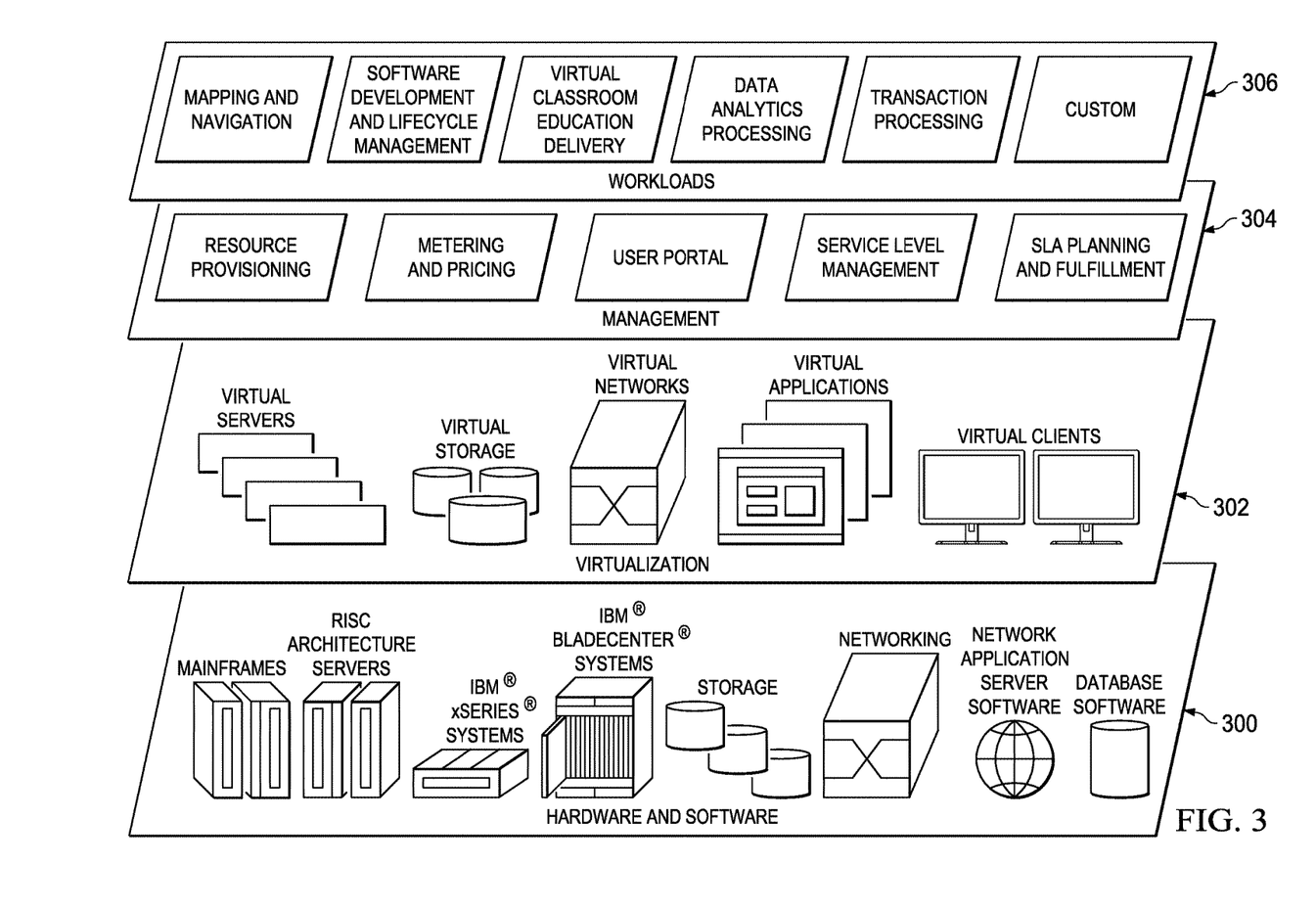
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 4:
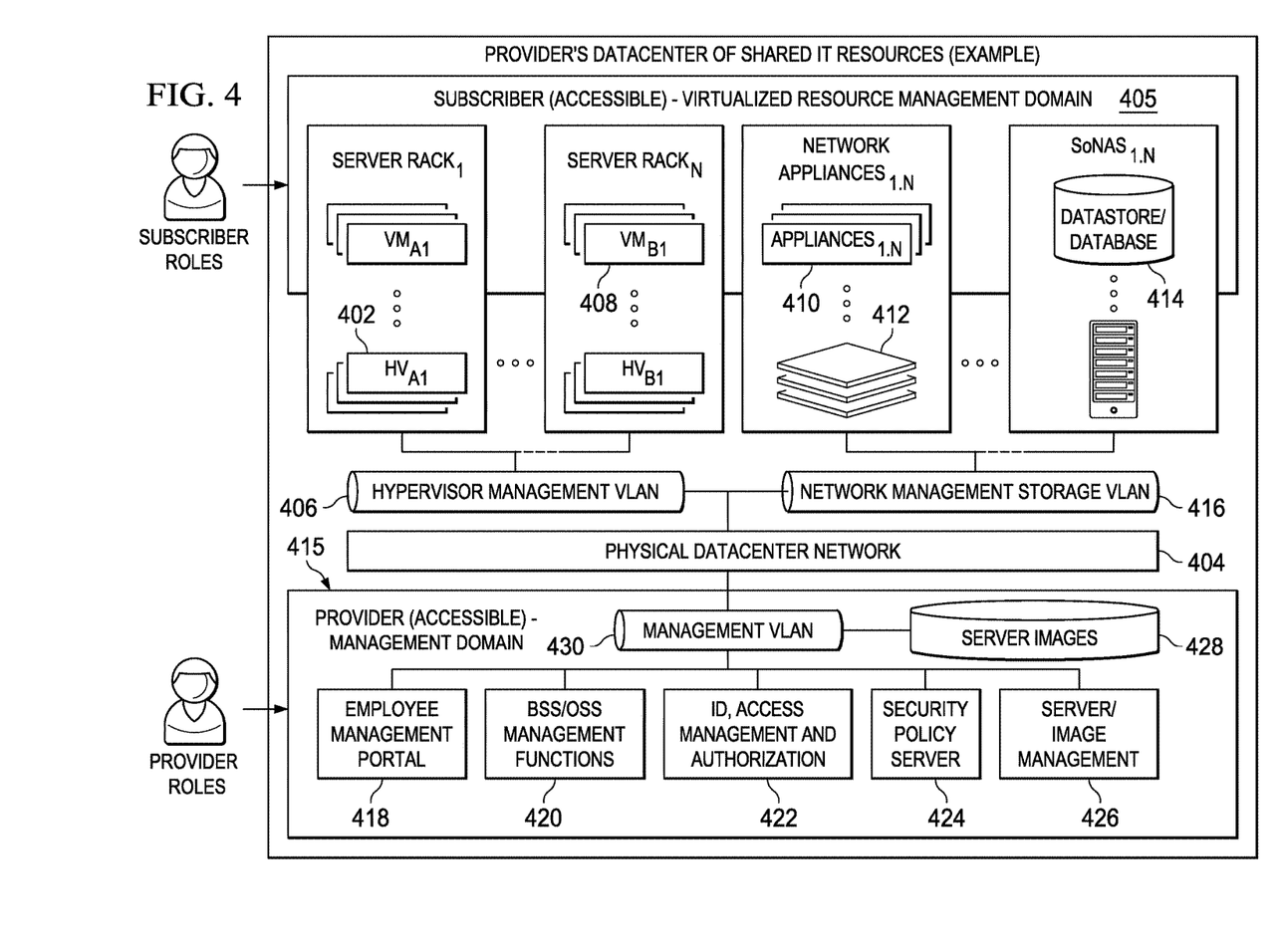
FIG. 4 depicts an exemplary data center in which the techniques of this disclosure may be implemented.

FIG. 4 illustrates a typical IT infrastructure that supports virtualization of resources and in which the below-described techniques of this disclosure may be implemented. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

SaaS Environment Security

It is known in the art to configure or provision cloud architectures such as described above to include mechanisms and systems that operate generally to gather (or otherwise obtain from other data sources) information about available cloud platforms, topologies and capabilities. Typically, cloud security may be implemented and enforced with various techniques that include, without limitation, virtual perimeter networks (DMZs), network segregation, storage isolation, Intrusion Prevention System (IPS) deployment, Security Information and Event Management (STEM) deployment, reverse proxies, firewalls, SSL communication, configuration with existing STEM, multi-factor authentication, risk-based authentication, and others.

For example, a commercial SIEM log management solution is IBM® Security QRadar® STEM, which consolidates log source event data from up to thousands of devices, endpoints and applications distributed throughout a network. It also performs immediate normalization and correlation activities on raw data to distinguish real threats from false positives. As an option, this software solution may incorporate IBM Security X-Force® Threat Intelligence, which supplies a list of potentially malicious IP addresses including malware hosts, spam sources and other threats. IBM Security QRadar STEM can also correlate system vulnerabilities with event and network data, helping to prioritize security incidents. This solution thus provides near real-time visibility for threat detection and prioritization, delivering surveillance throughout the entire IT infrastructure. It reduces and prioritizes alerts to enable administrators to focus investigations on an actionable list of suspected incidents. It enables more effective threat management while producing detailed data access and user activity reports. It also delivers robust security intelligence in cloud environments, including producing detailed data access and user activity reports to help manage compliance. The solution also provides a master console to help managed service providers provide security intelligence solutions in a cost-effective manner.

Figure 5:
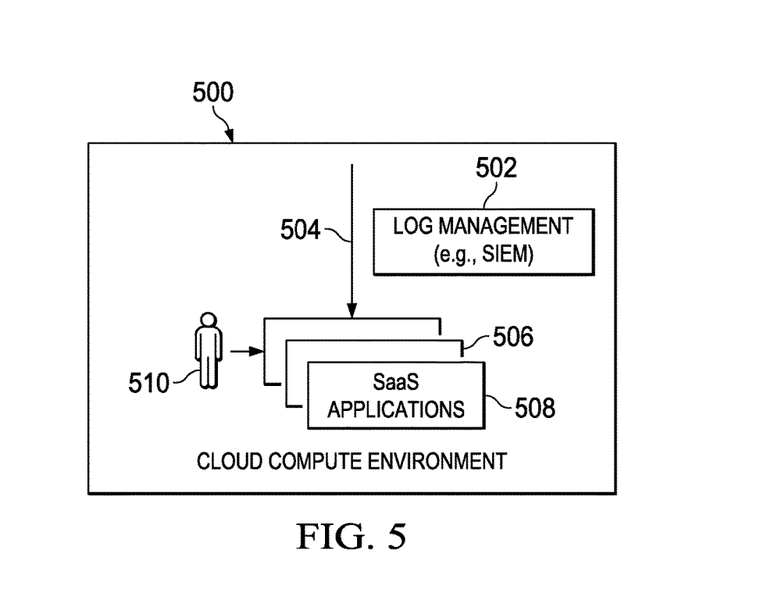
FIG. 5 illustrates an exemplary operating environment in which SIEM log management solution interoperates with a SaaS environment.

While log management solutions like those described above provide significant advantages, monitoring in a SaaS-based environment has significant challenges. To see why this the case, reference is now made to FIG. 5, which depicts a log management solution such as IBM QRadar SIEM 502 being used to monitor a Customer Relationship Management cloud application 504, such as SalesForce® CRM, in a multi-tenant cloud environment 500. As is well-known, SIEM 502 uses an event model that looks for log events (from log sources) via syslog, HTTP receivers, REST-based code (to fetch from APIs), and the like. The log events fetched are consumed, and a security intelligence engine in the SIEM uses rules to detect anomalies. Although this approach works well for normal logs, many resources inside the cloud application (e.g., "Users") can be in several defined STATES, such as "frozen," "terminated," "locked," "active," "deleted" and others. Such states often change dynamically and thus are unsuitable to be captured as logs, because capturing them would be very costly (requiring API calls for 'n' user of 'n' tenants across 'n' SaaS applications) and such data would make anomaly detection more difficult due to the searching and indexing requirements to keep track of state (e.g., a "last state"). As a consequence, known log management configurations of this type (which are based on event-based models) can exhibit performance bottlenecks.

In addition, and again with reference to FIG. 5, there may be multiple additional cloud applications 506, 508, etc. in the multi-tenant cloud environment 500, and different ones of the various cloud applications may have various dependencies. For example, when user 510 in cloud application 504 desires to have that application take action (e.g., upload a file) on the user's behalf in cloud application 506, it is desirable for the security infrastructure to monitoring for anomalies that may arise. To achieve this, the security infrastructure needs to monitor/assess the state of user 508 in each application in the multi-tenant environment 500, the nature of any privileged access (of users in cloud application 504 and cloud application 506), as well as the logs created in each cloud application. Here again, however, current event-based log management solutions do not provide support for any such federated monitoring of such dependencies, as such known techniques instead typically rely upon rule-based approach that do not account for them.

User State Tracking and Federated Anomaly Detection in a SaaS Environment

Figure 6:
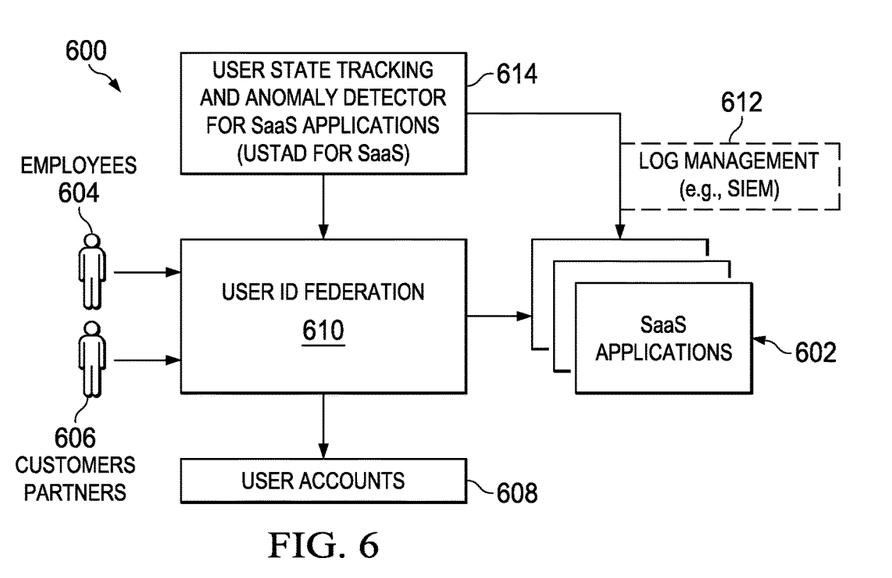
FIG. 6 depicts the user state tracking and anomaly detector for SaaS applications according to this disclosure.

With the above as background, the technique of this disclosure is now described. A representative operating environment is shown in FIG. 6. As depicted, a multi-tenant cloud environment 600 comprises a set of SaaS applications 602. A given SaaS application 602 in the environment 600 typically supports multiple tenants. A particular tenant may be an enterprise whose employees 604 use the SaaS application, and the enterprise may have customers/partners 606 that also need to access the SaaS application. The employees 604 and customers/partners 606 have user accounts 608 that may be managed in the context of a user ID federation 610, all in a known manner. As also depicted, the cloud environment supports or is associated with a log management solution, such as a SIEM 612. As noted above, a representative STEM is IBM QRadar, although this is not a requirement. The STEM may be located within the cloud environment, but this is not a requirement either.

Figure 7:
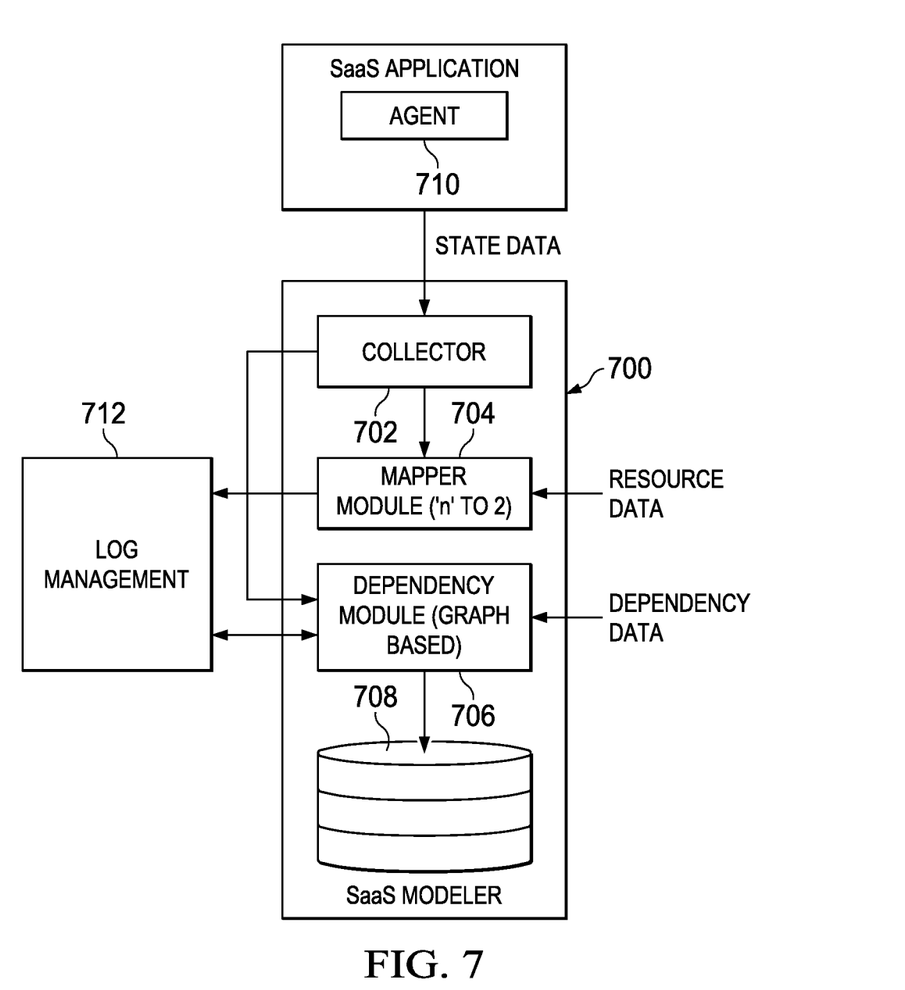
FIG. 7 depicts the user state tracking and anomaly detector in a particular embodiment.

According to this disclosure, the above-described environment is augmented to include a user state tracking and anomaly detector 614 (USTAD) for the SaaS applications 602 ("USTAD for SaaS"). As depicted in FIG. 7, and as described in detail below, the user state tracking an anomaly detector 700 comprises a set of modules, e.g., a collector module 702, a mapper module 704, a dependency module 706, and a SaaS modeler 708. In one embodiments, these modules receive information from each of a set of agent modules 710, where each agent module 710 is supported in association with a particular SaaS application 712. The agent module 710 may comprise a component of the USTAD, or it may be a component or function that is native to the SaaS application itself. In an alternative embodiment, the agent modules 710 are not required, as the collector 702 operates to poll a particular SaaS application for the STATE and dependency information. As depicted in FIG. 7, the USTAD 700 typically also includes a web-based interface, a database, and other hardware and software support (not shown) as needed to enable the USTAD to communicate and interoperate with the other devices and systems (e.g., the STEM, the cloud environment, e). The modules 702, 704, 706 and 708 may comprise a single integrated module, or they may be distinct from one another. Some but not all of the modules may be integrated with one another. Typically, the USTAD components are implemented as software, e.g., as distinct sets of computer program instructions that are executed to perform the functions and operations described below. A module may have multiple instances, and those instances may be co-located or execute remote from one another. One or more co-located or distributed computing machines comprise hardware processors and computer memory to support the modules. The physical support may be provided by the cloud itself, or the USTAD may operate in a standalone manner.

A given SaaS application in the environment typically supports multiple tenants, and the application typically has many user STATES (e.g., user terminated, user frozen, user active, etc.) Users are assumed to use multiple SaaS applications in the environment, and thus given SaaS applications necessarily have operating dependencies upon one another. The number and nature of the user STATES varies across SaaS application. As also noted above, individual SaaS applications in the cloud environment typically have dependencies on one another that arise, for example, when a particular SaaS application makes a request (typically on behalf of a user) to take some action with respect to some other SaaS application in the environment. The number and nature of the application dependencies likewise varies across the SaaS environment, and these dependencies often change dynamically. Logging SaaS application activity in such an operating environment is quite a complex challenge, which the USTAD of this disclosure addresses in the manner now described.

In particular, and as will be seen, the mapper module 704 operates to reduce the complexity of user STATE data from "n" different user STATES to a small number of states that is much more manageable (by the log management solution). Preferably, the mapper module also takes into consideration resource data (or, more generally, a resource context) to determine the reduced mapped state. For example, a User in locked state may have read permission on a less critical file resource (green), but a locked user updating a sales pipeline object resource on the SaaS might be red. The mapper module may also leverage external data, e.g., data from an LDAP Directory, to determine the reduced states. Generalizing, the mapper may take as input state of the users and/or resources data.

Figure 8:
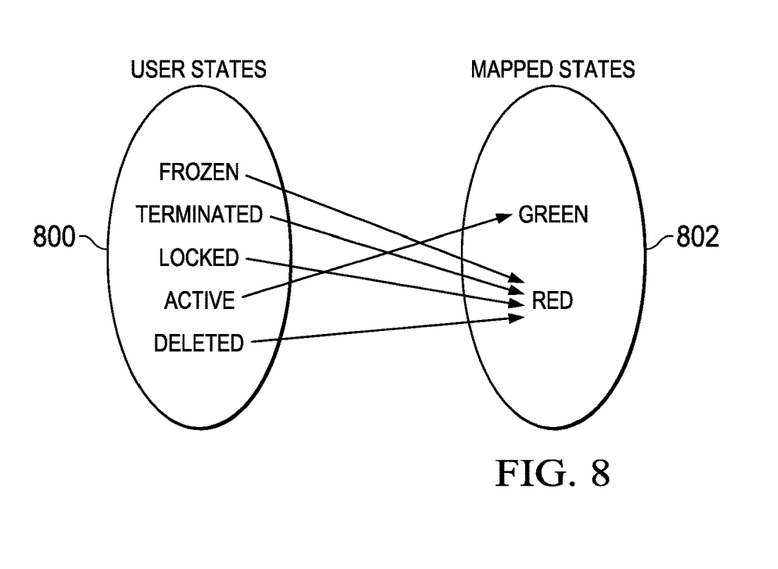
FIG. 8 illustrates an example entity-relationship mapping for a SaaS application that is used implemented by the mapper module of the detector.

In a preferred embodiment, the collector module 702 obtains the user STATE data from the SaaS applications that are configured or provisioned to provide it, and the mapper module 704 then takes that data and performs an entity-relationship mapping. As depicted in an entity-relationship diagram shown in FIG. 8, the mapper module maps "n" number of user STATES 800 to a reduced number of mapped states 802. The particular entity-relationship mapping depicted in FIG. 8 is merely exemplary, as different SaaS applications typically have different user STATES, and the number and the nature of the mapping performed by the mapping module may vary across the supported SaaS applications. In the example in FIG. 8, the user STATES "Frozen," "Terminated," "Locked" and Deleted" map to the "Red" mapped state, while a STATE "Active" maps to the "Green" mapped state. There may be other user STATES that are not shown, and there may be additional mapped states, although preferably only two are used to simplify logging. In one embodiment, the "Green" state corresponds to an acceptable functioning state, and the "Red" state corresponds to a non-acceptable or malfunctioning state. As noted, more than two (2) mapped states may be used, in which case "degrees" or "levels" of acceptability or non-acceptability may be used. The resulting mapped STATE data is the provided to the log management solution, as previously described, to facilitate logging in the multi-tenant SaaS environment.

In addition, preferably the collector module 702 in the user state tracking and anomaly detector collects (or otherwise receives) the dependency data that indicates SaaS application dependencies or from which such dependencies are derived. Typically, a relationship is built based on dependency/access permission between users and resources. In one embodiment, the dependency module 706 in the detector uses such information, preferably to generate a dependency graph, such as a statistical dependency graph that is based on dependency relationships between respective ones of the plurality of SaaS applications. Typically, the dependency data is discovered by monitoring request and response flow between or among the SaaS applications. A given SaaS application dependency may be static or dynamic, and a particular request or response associated with an application that has such a dependency thus may be "valid" or "invalid" depending on the nature of the dependency. According to this disclosure, the dependency data is represented in the dependency graph, e.g., a real-time directed graph G=(V, E), where a V is a node in the graph that represents a SaaS user/resource, and E is an edge in the graph that represents a dependency link between the resources. An edge E is created whenever a dependency is created, and an edge E is deleted when this dependency changes or is deleted. Using the dependency graph, the SaaS modeler 708 (in FIG. 7) checks whether a particular dependency-based request associated with a SaaS application is valid or invalid, and it take one or more given actions, e.g., report the results back to the associated log management solution.

Figure 9:
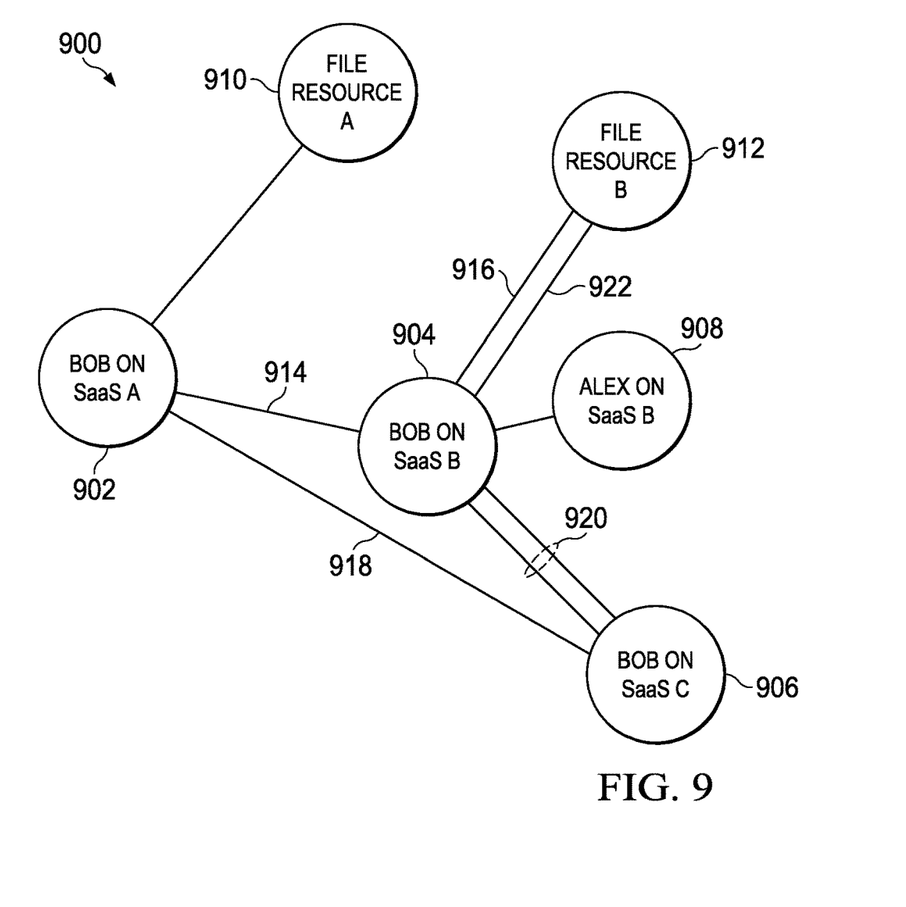
FIG. 9 depicts a portion of a dependency graph generated by the dependency modeler of the detector.

FIG. 9 depicts a representative dependency graph for users "Alex" and "Bob" and a number of SaaS applications, SaaS A, SaaS B and SaaS C. This graph is generated by the dependency module, which as noted performs graph-based modeling. For this reason the dependency module is sometimes referred to herein as a dependency modeler. In this example, it is assumed that the mapping module has mapped Alex to a "Red" state on both SaaS A and SaaS B, while "Bob" is mapped "Green" on SaaS A but "Red" on SaaS B. These mapped STATES are reported to the log management solution, as previously described. FIG. 9 represents an example dependency graph 900 that includes a number of nodes V and edges E. Thus, node 902 represents "Bob on SaaS A," node 904 represents "Bob on SaaS B" (thereby creating a dependency between SaaS A and SaaS B), node 906 represents "Bob on SaaS C," node 908 represents "Alex on SaaS B," node 910 represents "File Resource A" (a resource on SaaS A) and node 912 represents "File Resource B" (a resource on SaaS B). With this graph, dependency can be checked (e.g., by the SaaS modeler) by utilizing a graph path traversal algorithm. In general, an algorithm of this type identifies all vertices (nodes) that can be reached from a dependency request starting point and checks is a last node reached from the starting point is the dependency in question. If so, the algorithm returns "valid" but otherwise returns "invalid." An example would be path 914, 916 in FIG. 9, which represents a valid path from Bob on SaaS A to File Resource B (via Bob on SaaS B). An alternative valid path from Bob on SaaS A to File Resource B may be path 918, 920 and 922 (via Bob on SaaS C).

Generalizing, by checking the dependencies on routes, the SaaS modeler (which provides the basic anomaly detection operation) can provide the log management system (or other management devices) useful information. For example, if the link 914 is broken, then the alternative path (918, 920 and 922) may still be active, thereby linking Bob's identities across another valid path so that Bob still gets access (and "valid" information is sent to the dependency modeler). In an alternative, if one of Bob's identities is broken, the graph still shows all of the associated nodes and linked identities to suggest (e.g., to the log management system) other places that may be compromised. Corrective action (e.g., notifying Bob to change his password) may then be taken or initiated.

As noted above, the "valid" or "invalid" information preferably is passed on to the log management solution, or any other device or system can poll for and fetch such information from the dependency module (modeler).

Although a preferred implementation is depicted (e.g., as shown in FIG. 7) with the USTAD implemented as a service (e.g., a web service) intermediate a log management solution and the multi-tenant cloud infrastructure, this is not a limitation. The USTAD (or some components thereof) may be part of the log management solution itself, or part of other cloud security architecture. The USTAD may be implemented as a management solution, service, product, appliance, device, process, program, execution thread, or the like. Typically, and as noted, the techniques are implemented in software, as one or more computer programs executed in hardware processing elements, in association with data stored in one or more data sources. Some or all of the processing steps described may be automated and operate autonomously in association with other systems. The automation may be full- or partial, and the operations (in whole or in part) may be synchronous or asynchronous, demand-based, or otherwise.

Without limitation, the USTAD (as a product or service) may be implemented within or in association with a cloud platform system or appliance (FIG. 4) as has been described, or using any other type of deployment systems, products, devices, programs or processes. As previously noted, the above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the USTAD product or service be executed by a particular component as named above, as the functionality herein (or any aspect thereof) may be implemented in other or systems. There is also no requirement that the solution provide explicit anomaly detection using the SaaS modeler, as other techniques and devices may be used for this purpose. In addition, the nature of the logging provided by the log management solution itself is not part of the USTAD, as a primary advantage of the USTAD is the providing (to the log management solution) of information that can be more readily consumed thereby.

The USTAD product or service may be implemented by a cloud service provider that operates infrastructure for a private cloud, a public cloud, or a hybrid cloud. It may be available as a managed service provided by a cloud service or some other service provider.

There may be alternative embodiments. Instead of having a single collector, there may be several worker collectors for each of the tenants in the SaaS applications. The worker collectors then feed the information to a master collector for sending to the mapper and dependency modules.

Another use case uses the USTAD to facilitate step-up authentication before an application enables a requested transaction. Thus, for example, based on the output from the modeler and anomaly detector, authentication is stepped up on the event of a detected anomaly. For example, the authentication may be stepped-up based on trust levels as defined by a SaaS application, user object information and/or other business attributes.

The subject matter herein provides significant advantages. In enables improved performance of log management solutions in fetching STATES associated with SaaS applications. It also enables improved performance of such management solutions in correlating and anomaly detection of SaaS environment. It provides a federated dependency monitoring solution that enables centralized tracking of dependencies across SaaS applications. The depending monitoring is dynamic and thus highly effective, as the approach does not rely on predefined rule-based dependency tracking. The approach provides for improved performance of log management solutions in offense detection of dependencies between or among SaaS applications. The techniques herein also provide for better application monitoring of SaaS environments. By providing for improved correlation, anomaly detection mechanisms that use the correlated information have been performance, thereby enhancing security. Another advantage is the providing of better and more fine-grained context information about the operations of the multiple SaaS applications. Indeed, the tracking of a relationship between users and resources (e.g., using log-derived data, or data derived from other sources) enables configured and dynamic state of a per-application user identity to be determined in a multi-tenant cloud application environment.

The techniques herein may be extended to other cloud models including PaaS and IaaS.

As described, the approach herein may be implemented manually or in an automated manner, in whole or in part.

While a preferred operating environment and use case (a cloud appliance or platform) has been described, the techniques herein may be used in any other operating environment in which it is desired to deploy applications or other services while enforcing a given security context.

The approach may be integrated in a STEM, such as IBM QRadar, or the like.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment as described above, the functionality provided herein is implemented as an adjunct or extension to an existing cloud compute deployment solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, log management solutions and cloud computing environments, as well as improvements to the functioning of related logging facilities and systems.

As noted, the nature of the log data and what that data is used for (e.g., auditing, compliance, etc.) is not a limitation of this disclosure.

Having described our invention, what we now claim is as follows:

1. A method for improving a log management system in a Software-As-A-Service (SaaS) environment having a plurality of cloud applications, the log management system normally configured to consolidate log source event data to detect anomalies, comprising:
    obtaining, from each of a set of cloud applications, user state data with respect to one or more resources as users interact with the cloud application, wherein given cloud applications in the set have operating dependencies on one another based at least in part on a user state;
    for a given cloud application in the set, mapping the user state data to a reduced set of states, the reduced set of states including at least a first state indicating an acceptable functioning state with respect to a user and resource at the given cloud application, and a second state indicating a malfunctioning state with respect to the user and resource at the given cloud application;
    monitoring requests between or among the set of cloud applications;
    building a dependency graph based on dependency relationships between respective ones of the cloud applications, the dependency graph being a directed graph of nodes and edges, wherein a node in the directed graph represents a cloud application user and resource, and an edge in the directed graph represents a dependency link between resources, the dependency relationships discovered by monitoring the requests; and
    outputting the reduced set of states together with dependency information derived from the dependency graph to improve performance of the log management system to facilitate a logging operation and detect anomalies.

2. The method as described in claim 1 wherein user state data is collected for a single tenant enterprise in the SaaS environment.

3. The method as described in claim 1 further including assessing whether a dependency request is valid according to the dependency graph by executing a graph path traversal algorithm that identifies a subset of nodes reached from a dependency request starting point and determines whether a last node reached from the dependency request starting point is a given dependency.

4. The method as described in claim 3 further including providing an indication that the dependency request has been determined to be valid.

5. The method as described in claim 1 wherein the logging operation is provided by the log management system.

6. The method as described in claim 1 wherein the user state data is obtained by receiving user state data provided by the given cloud application or by polling the given cloud application to provide such data.

7. Apparatus, comprising:
    a processor;
    computer memory holding computer program instructions executed by the processor to improve a log management system in a Software-As-A-Service (SaaS) environment having a plurality of cloud applications, the log management system normally configured to consolidate log source event data to detect anomalies, the computer program instructions comprising program code configured to:
- obtain, from each of a set of cloud applications, user state data with respect to one or more resources as users interact with the cloud application, wherein given cloud applications in the set have operating dependencies on one another based at least in part on a user state;
- for a given cloud application in the set, map the user state data to a reduced set of states, the reduced set of states including at least a first state indicating an acceptable functioning state with respect to a user and resource at the given cloud application, and a second state indicating a malfunctioning state with respect to the user and resource at the given cloud application;
- monitor requests between or among the set of cloud applications;
- build a dependency graph based on dependency relationships between respective ones of the cloud applications, the dependency graph being a directed graph of nodes and edges, wherein a node in the directed graph represents a cloud application user and resource, and an edge in the directed graph represents a dependency link between resources, the dependency relationships discovered by monitoring the requests; and
- provide the reduced set of states together with dependency information derived from the dependency graph to improve performance of the log management system to facilitate a logging operation and detect anomalies.

8. The apparatus as described in claim 7 wherein user state data is collected for a single tenant enterprise in the SaaS environment.

9. The apparatus as described in claim 7 wherein the program code also assesses whether a dependency request is valid according to the dependency graph by executing a graph path traversal algorithm that identifies a subset of nodes reached from a dependency request starting point and determines whether a last node reached from the dependency request starting point is a given dependency.

10. The apparatus as described in claim 9 wherein the program code provides an indication that the dependency request has been determined to be valid.

11. The apparatus as described in claim 7 wherein the logging operation is provided by the log management system.

12. The apparatus as described in claim 7 wherein the user state data is obtained by receiving user state data provided by the given cloud application or by polling the given cloud application to provide such data.

13. A computer program product in a non-transitory computer readable medium for use in a data processing system, the computer program product holding computer program instructions executed by the data processing system to improve a log management system in a Software-As-A-Service (SaaS) environment having a plurality of cloud applications, the log management system normally configured to consolidate log source event data to detect anomalies, the computer program instructions comprising program code operative to:
- obtain, from each of a set of cloud applications, user state data with respect to one or more resources as users interact with the cloud application, wherein given cloud applications in the set have operating dependencies on one another based at least in part on a user state;
- for a given cloud application in the set, map the user state data to a reduced set of states, the reduced set of states including at least a first state indicating an acceptable functioning state with respect to a user and resource at the given cloud application, and a second state indicating a malfunctioning state with respect to the user and resource at the given cloud application;
- monitor requests between or among the set of cloud applications;
- build a dependency graph based on dependency relationships between respective ones of the cloud applications, the dependency graph being a directed graph of nodes and edges, wherein a node in the directed graph represents a cloud application user and resource, and an edge in the directed graph represents a dependency link between resources, the dependency relationships discovered by monitoring the requests; and
- provide the reduced set of states together with dependency information derived from the dependency graph to improve performance of the log management system to facilitate a logging operation and detect anomalies.

14. The computer program product as described in claim 13 wherein user state data is collected for a single tenant enterprise in the SaaS environment.

15. The computer program product as described in claim 13 wherein the program code also assesses whether a dependency request is valid according to the dependency graph by executing a graph path traversal algorithm that identifies a subset of nodes reached from a dependency request starting point and determines whether a last node reached from the dependency request starting point is a given dependency.

16. The computer program product as described in claim 15 wherein the program code provides an indication that the dependency request has been determined to be valid.

17. The computer program product as described in claim 13 wherein the logging operation is provided by the log management system.

18. The computer program product as described in claim 13 wherein the user state data is obtained by receiving user state data provided by the given cloud application or by polling the given cloud application to provide such data.

* * * * *